(12) United States Patent
Ezra

(10) Patent No.: US 9,894,345 B2
(45) Date of Patent: Feb. 13, 2018

(54) STEREOSCOPIC CAMERA SYSTEM WITH MULTIPLE CONFIGURATIONS

(71) Applicant: Jacob Ezra, Bishops Stortford (GB)

(72) Inventor: Jacob Ezra, Bishops Stortford (GB)

( * ) Notice: Subject to any disclaimer, the term of this patent is extended or adjusted under 35 U.S.C. 154(b) by 15 days.

(21) Appl. No.: 14/900,115

(22) PCT Filed: Jun. 17, 2014

(86) PCT No.: PCT/GB2014/051865
§ 371 (c)(1),
(2) Date: Dec. 18, 2015

(87) PCT Pub. No.: WO2014/202971
PCT Pub. Date: Dec. 24, 2014

(65) Prior Publication Data
US 2016/0150216 A1    May 26, 2016

(30) Foreign Application Priority Data

Jun. 18, 2013   (GB) .................................. 1310849.3

(51) Int. Cl.
| G03B 17/56 | (2006.01) |
| H04N 13/02 | (2006.01) |
| G03B 35/08 | (2006.01) |
| F16M 11/04 | (2006.01) |
| G03B 17/17 | (2006.01) |
| G02B 27/10 | (2006.01) |

(52) U.S. Cl.
CPC ....... *H04N 13/0239* (2013.01); *F16M 11/045* (2013.01); *F16M 11/048* (2013.01); *G02B 27/1066* (2013.01); *G03B 17/17* (2013.01); *G03B 17/561* (2013.01); *G03B 35/08* (2013.01)

(58) Field of Classification Search
None
See application file for complete search history.

(56) References Cited

U.S. PATENT DOCUMENTS

| 2,236,069 | A | 3/1941 | Robinton |
| 2011/0187833 | A1 | 8/2011 | Hines |
| 2011/0249963 | A1* | 10/2011 | Cramer ................ F16M 11/041 396/325 |
| 2012/0163788 | A1 | 6/2012 | Takashi et al. |
| 2014/0193144 | A1* | 7/2014 | Coster .................. F16M 11/045 396/325 |

FOREIGN PATENT DOCUMENTS

WO        02 075453 A1    9/2002

* cited by examiner

*Primary Examiner* — Kevin McInnish
(74) *Attorney, Agent, or Firm* — Andrew W. Chu; Craft Chu PLLC

(57) ABSTRACT

A stereoscopic 3D camera system includes a first camera, which has a first optical axis, and a second camera, which has a second optical axis; a beam splitter; and a mirror. The camera system is arranged to be re-configurable between a first configuration, in which the first optical axis is incident on the beam splitter, and a second configuration, in which the first optical axis is incident on the mirror.

11 Claims, 4 Drawing Sheets

STEREOSCOPIC CAMERA SYSTEM WITH MULTIPLE CONFIGURATIONS

CROSS-REFERENCE TO RELATED APPLICATIONS

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to stereoscopic 3D (three dimensional) camera systems. In particular, it relates to a stereoscopic 3D camera system that is reconfigurable.

2. Description of Related Art Including Information Disclosed Under 37 CFR 1.97 and 37 CFR 1.98

There are three known stereoscopic 3D camera systems:

Firstly, there are fixed lens separation cameras in which CCD image chips are fixed at a predetermined distance apart. Many commercially available 3D cameras, including both domestic and professional camcorders, are produced in this way. A typical fixed lens separation system is shown in FIG. 1.

Secondly, there are side-by-side systems with variable separation between adjacent cameras. A side-by-side camera set-up allows for adjustment of the spacing of the cameras. That is to say, the distance between lens centres may be adjusted. When the cameras abut is the closest the cameras can be positioned to one another. A typical side-by-side system is shown in FIG. 2.

Thirdly, there are mirror rigs, wherein two cameras of a 3D stereoscopic rig interact with a 50/50 front beam-splitter. The usual configuration is that one camera looks through the beam-splitter, which comprises a semi-silvered mirror, while the other camera is reflected off it. The advantage of this configuration, in contrast to the fixed lens and side-by-side arrangements discussed above, is that the cameras can operate from zero separation, outwardly. A typical mirror rig is shown in FIG. 3.

Each of these systems suffers from disadvantages. In this regard, it must be noted that the separation (or "interaxial" distance apart) of a pair of cameras affects the depth perceived on a 3D display. For achieving a good 3D effect in a macro situation, such as the filming of an insect or similar, a very small separation is required. In contrast, for achieving a good 3D effect when filming a larger scene, such as a sporting event, a much larger separation will be required.

A 3D camera with a fixed lens separation arrangement, whilst compact, is inflexible when it comes to adjustment of "best-practice" depth management as this can only be achieved by mechanical separation of the pair of image chips or pair of cameras. This is not to be confused with "convergence" or "toe-in", which is the targeting of the two cameras. In essence, no variable separation is possible with a fixed lens separation arrangement. There are no means for increasing the separation or interaxial distance needed for good 3D.

In a side-by-side arrangement, the closest separation obtainable is determined by the width of the body and/or elements emanating from the camera body. Some broadcast cameras can be quite large, bulky bodied, items, making many 3D filming situations impractical. Side-by-side broadcast cameras are usually used for filming field event sports such as football and rugby matches where the camera-rig must be placed far away from the action being filmed.

In a mirror rig, whilst a zero separation is possible, the camera looking through the semi-silvered mirror loses 50% of the light, while both cameras might suffer from image degradation due to dust, scratches or smears on the surface of the mirror.

BRIEF SUMMARY OF THE INVENTION

It is the intention of this invention to overcome the restrictions of the above mentioned 3D camera systems by the unique provision of a stereoscopic 3D camera system that is reconfigurable.

According to the present invention, in a first aspect, there is provided a stereoscopic 3D camera system comprising: a first camera, which has a first optical axis, and a second camera, which has a second optical axis; a beam splitter; and a mirror, wherein the camera system is arranged to be re-configurable between a first configuration, in which the first optical axis is incident on the beam splitter, and a second configuration, in which the first optical axis is incident on the mirror.

In the first configuration the first camera looks at the beam splitter and in the second configuration the camera looks at the mirror.

The camera system may further be arranged such that, in the first configuration, the second optical axis is incident on the beam splitter, and in the second configuration, the second optical axis is not incident on either the beam splitter or the mirror. In the second configuration, no part of the system lies on the optical axis looking out from the second camera. The second optical axis may be incident on an aperture/void.

By such arrangement, in the first configuration the second camera looks through the beam splitter and in the second configuration the second camera looks through neither the beam splitter nor the mirror. In the second configuration the second camera has its view entirely unobstructed.

Means may be provided for effecting relative movement between the first camera and the beam splitter and the mirror, which relative movement allows for the transition between the first and second configurations. The beam splitter and the mirror may be moved together or independently of one another.

Means may be provided for effecting relative movement between the second camera and the beam splitter, which relative movement allows for the transition between the first and second configurations.

A single means may be provided for effecting movement of the first and second cameras relative to the beam splitter and/or the mirror.

The beam splitter and mirror may be detachably mountable to the camera system. In this case, they are most preferably independently detachably mountable.

Further, preferred, features are provided in the dependent claims.

According to the present invention, in a further aspect, there is provided a stereoscopic 3D camera system utilizing a rotating disk with at least two apertures, housing: a) a beam-splitter; and b) a mirror in just one half with the other half being a void for a camera to look through.

According to the present invention in a yet further aspect, there is provided a stereoscopic 3D camera system utilizing a plate with at least two distinct configurations as apertures or as one (glass) panel which incorporates: a) a beam-splitter; and b) a mirror in just one half with the other half being a void for a camera to look through, where the plate moves sideways, slides up/down, hinges or moves in or out of the way of the cameras, so as to offer both a beam-splitter set-up or a side by side set-up.

It should be noted that the term "mirror" as used herein relates to a surface having as close to 100% light reflectivity as is practicable, wherein the transmission of light therethrough is not possible. The term "beam splitter" as used herein relates to an element that whilst reflective (and possibly comprising a 50/50 mirror) allows for the transmission of light therethrough.

BRIEF DESCRIPTION OF THE SEVERAL VIEWS OF THE DRAWINGS

Non-limiting embodiments will now be described, by way of example only, with reference to the accompanying drawings.

DETAILED DESCRIPTION OF THE INVENTION

Figure 1:
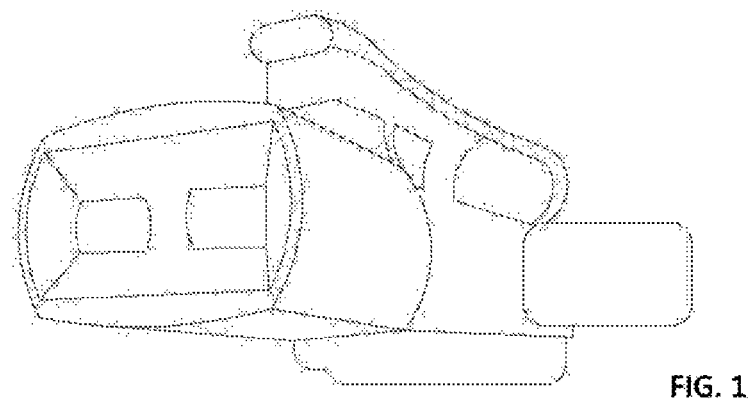
FIG. 1 shows a perspective view of a prior art fixed lens/separation stereoscopic 3D broadcast camera.
Figure 2:
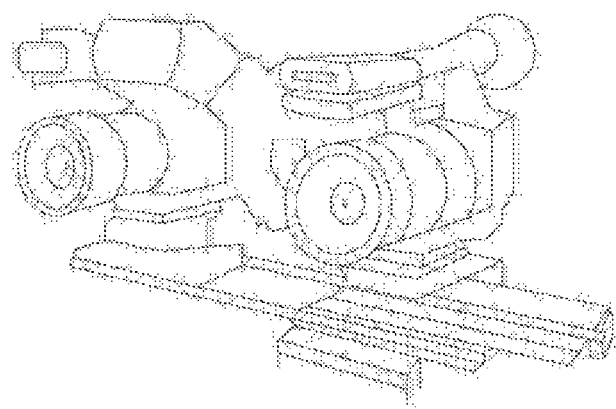
FIG. 2 shows a perspective view of a prior art side by side stereoscopic 3D camera rig supported on a variable separation platform.
Figure 3:
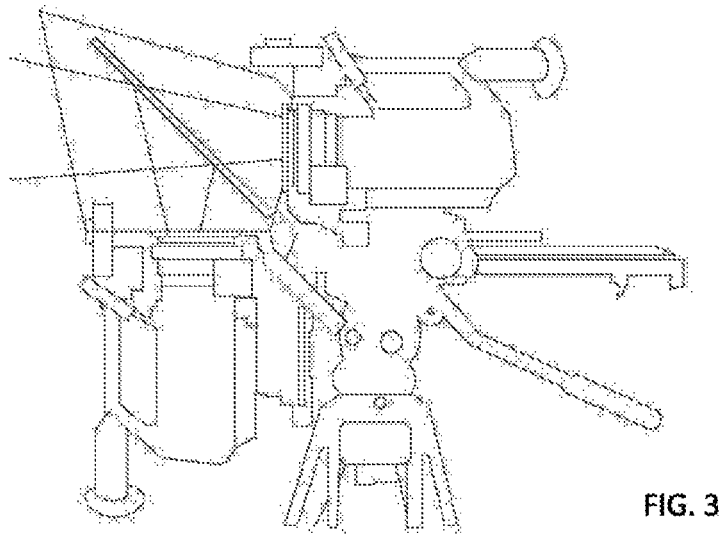
FIG. 3 shows an elevation view of a prior art beam splitter stereoscopic 3D camera rig with diagrammatic mirror and camera ray paths.

Arrangements according to the present invention, uniquely offer the advantages provided by both the side-by-side camera systems and mirror-rigs of the prior art. In essence the arrangements according to the present invention may operate in either a mode equivalent to the side-by-side systems (a "side-by-side" mode) or in a mode according to the mirror-rigs (a "mirror-rig" mode), as and when required.

All of the arrangements described herein are arranged such that in a first configuration the camera system is arranged in the "mirror-rig" mode with the first camera 3 looking at a beam splitter 6 (i.e. with the first optical axis of the first camera incident on the beam splitter) such that a reflected image is recorded by the first camera; and with the second camera 2 looking at the beam splitter 6 (i.e. with the second optical axis of the second camera incident on the beam splitter) such that an image viewed through the beam splitter is recorded by the second camera.

All of the arrangements described herein are further arranged such that in a second configuration the camera system is arranged in the "side-by-side" mode with the first camera 3 looking at a mirror 7 (i.e. with the first optical axis of the first camera incident on the mirror) such that a reflected image is recorded by the first camera; and with the second camera 2 looking at/through an aperture/void/hole 8 (i.e. with the second optical axis of the second camera incident on neither the beam splitter nor the mirror) such that an image to be recorded is received directly by the second camera, without any intervening element being present.

The first and second optical axes are preferably arranged at 90 degrees to one another. It should be noted that whilst the first camera 3 is shown to be looking up at the beam splitter in all of the depicted arrangements, it may equally be looking down, i.e. with the depicted configurations flipped through 180 degrees.

With the first and second optical axes arranged at 90 degrees to one another, the beamsplitter and mirror are arranged to lie on or parallel to the common plane between the cameras, which extends at 45 degrees to the first and second optical axes, between the cameras.

It should be noted, as will be readily appreciated by those skilled in the art, that any reflected camera image will require an electronic "flip" up/down to be activated to correct the orientation of the final image.

All of the arrangements described herein are preferably further arranged such that the cameras can move sideways, i.e. such that the first and second optical axes can be moved towards and away from one another in a direction that is perpendicular to both the first and second optical axes. The cameras may be mounted, for example, to each move from the centre of the camera system outwards. Such movement may be effected by mounting the cameras with a camera support means that comprises sliding rails powered by a lead screw. Movement may be manual or powered, by motors or otherwise. A motor 5 is shown in FIGS. 4 and 6.

It is preferable for at least one of the cameras to have some kind of height adjustment so that any defects in the lenses, or the zooming in and out of the lenses, may be compensated for. Suitable manual or motorized height adjustment can be applied, as will be readily appreciated by those skilled in the art.

Figure 4:
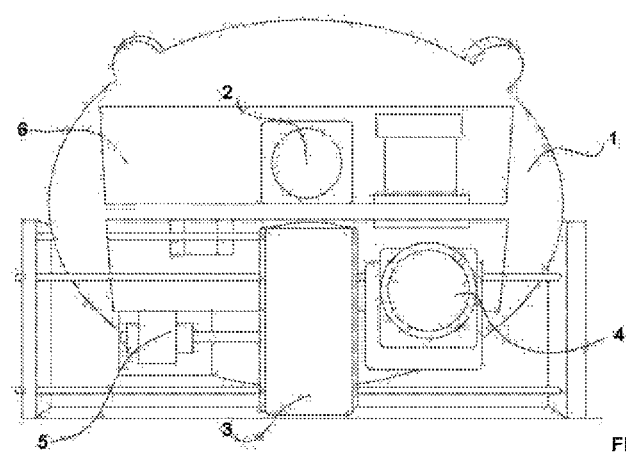
FIG. 4 shows an end elevation view of a camera system according to a first embodiment in a "mirror-rig" configuration.
Figure 5:
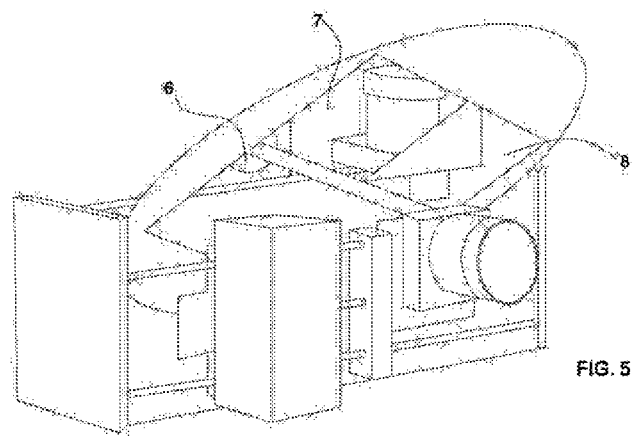
FIG. 5 shows a perspective view of the camera system of FIG. 4 with the mirror disk in transition.
Figure 6:
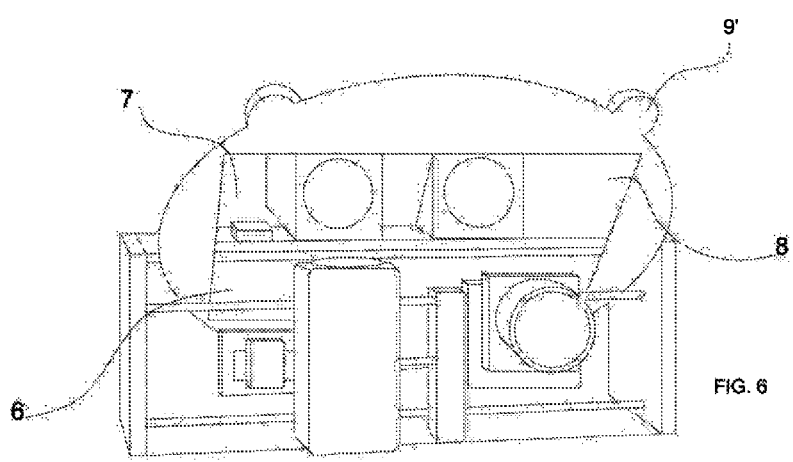
FIG. 6 shows another perspective view of the camera system of FIG. 4 in a "side-by-side" configuration.
Figure 7:
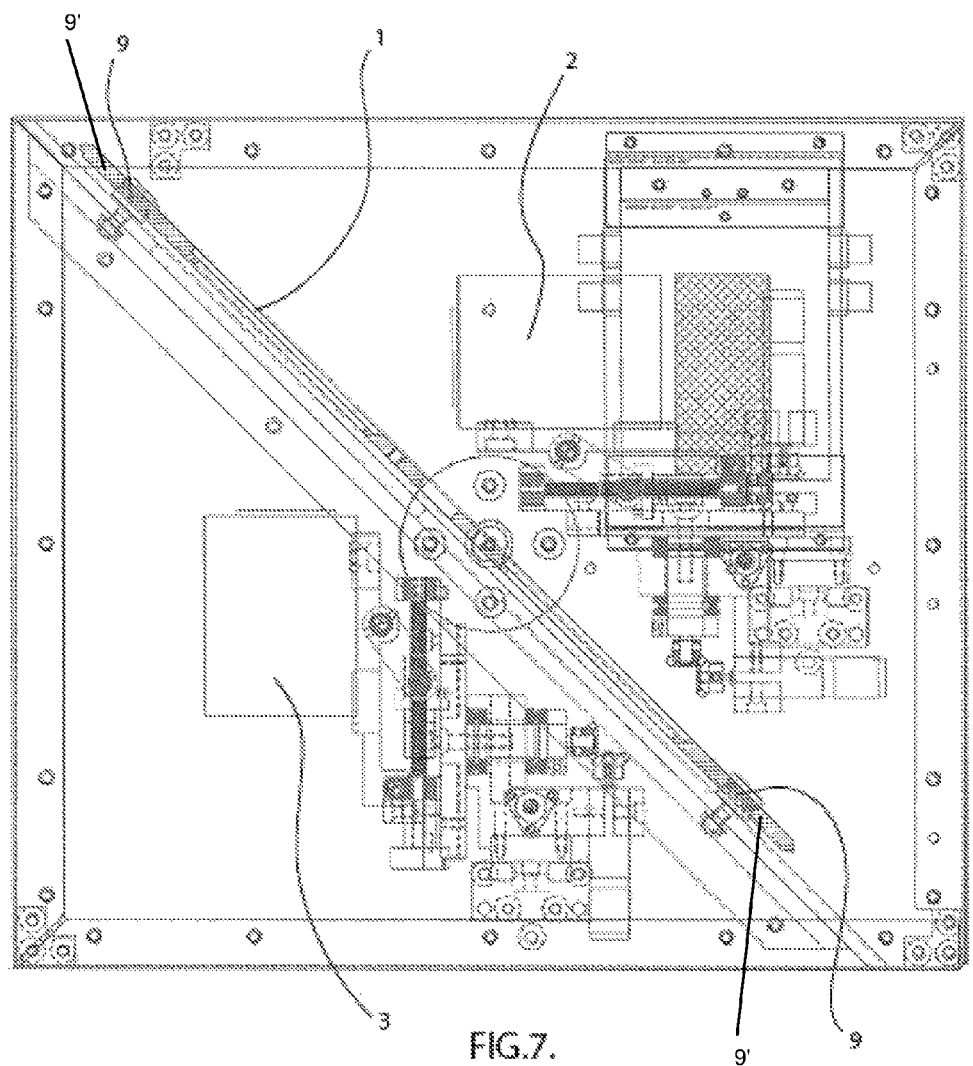
FIG. 7 shows a partial sectional view of the camera system of FIG. 4.

With reference to FIGS. 4 to 6, a first arrangement is shown, which comprises a rotatable disk 1. The rotatable disk 1 is provided with two apertures, which, as shown, are preferably rectangular. The first aperture houses a beam splitter 6, which preferably comprises a front silvered 50/50 mirror. The second aperture houses a high grade front-silvered mirror 7 in one half and a void 8 in the second half. The disk 1 is arranged at an oblique angle to the first and second optical axes, most preferably at an angle of 45 degrees thereto, between the cameras.

It should be noted that the beam splitter and the mirror may be mounted in any way which results in them covering, wholly or at least partially, the respective apertures. The beam splitter and the mirror may lie flush with the disk. The aperture for the beam splitter is preferably wholly covered whilst the aperture for the mirror is partially covered by the mirror and partially open to provide the void.

Mirror disk guide bearings 9 may be provided to allow for smooth rotation of the disk 1 and to keep the disk 1 in place as it rotates. Numerous alternative rotation/alignment means may also be provided, as will be readily appreciated by those skilled in the art. Note that the casing of the camera system and the supports 9' for the guide bearings are omitted for clarity from FIGS. 2 to 5.

The disk 1 may comprise a central toothed ring which is coupled to a geared motor via a toothed pulley belt. On activation of the motor the belt will pull the disk around to its new position. The motor may be fitted with an encoder to count pulses and/or revolutions, to enable the disk to stop in exactly the desired position for the cameras. Numerous alternative movement and control mechanisms will be readily appreciated by those skilled in the art. The disk may also be rotated manually if desired.

FIG. 4 shows the disk 1 in the "mirror-rig" mode. The second (left) camera 2 films through the beam splitter 6 whilst the first (right) camera 3 is pointed at and reflected off the beam splitter 6. Note a lamp 4, which may be included in the camera system, is reflected in the beam splitter.

FIG. 5 shows the disk 1 in transition between the "mirror rig" mode and the "side-by-side" mode.

FIG. 6 shows the mirror disk in the "side-by-side" mode. The second (left) camera 2 films through the void 8 (marked "hole") and the first (right) camera 3 is pointed at and reflected off the mirror 7.

When a user selects the beam splitter to interact with the cameras, i.e. "mirror rig" mode, objects and scenes can be filmed from zero separation, where the first and second optical axes lie in the same plane as one another (as seen in FIG. 4), which allows for 2D filming. The first and second cameras may further be moved outwards from zero separation to as wide as the rig will allow, which allows for "HyperStereo".

However, by virtue of the present arrangement, as soon as cameras are separate enough, equivalent to a "side-by-side" system, the disk 1 may be rotated into the second position (as seen in FIG. 5), which offers the alternative option of one camera looking through the void 8 whilst the other camera reflects off the high grade front silvered mirror 7. There is no loss of light in this arrangement. One camera is not looking through a beam splitter (semi-silvered mirror) and losing half the light, and the other camera is being reflected off a front silvered mirror, which also does not lose any light. This adds a significant increase in quality to the stereoscopic image.

Other engineered elements, as will be readily appreciated by those skilled in the art may be incorporated to allow for convergence or "Toe-In" of the cameras via motors/encoders and also to allow at least one, or both cameras, to offer height adjustment, as mentioned. Again, these features may be motorized or operated manually.

Whilst a rotating disk with two apertures, as described above, represents the preferred arrangement, since it allows for an extremely compact assembly, a number of other configurations are possible within the scope of the present invention. The beam splitter and mirror may be moved in and out of position in a number of different ways. Below, a non-exhaustive selection of further arrangements is considered.

Figure 8:
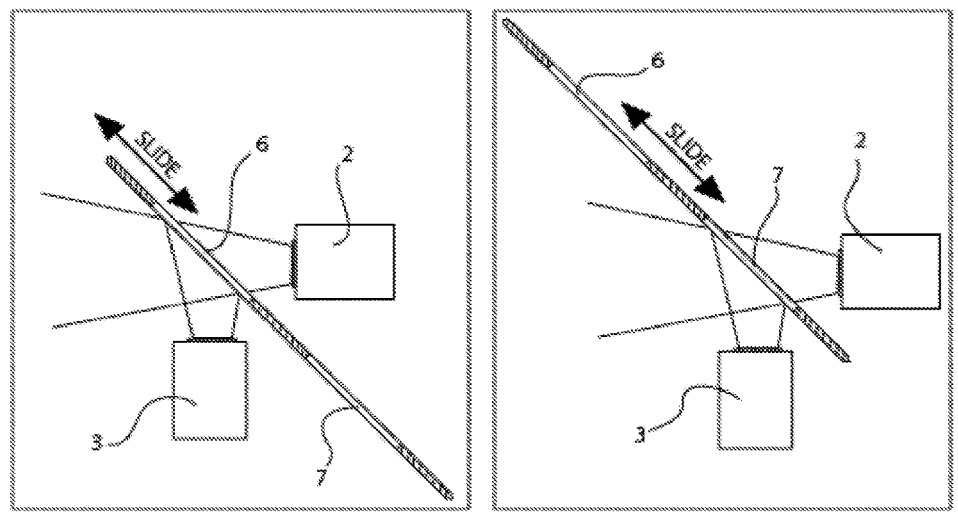
FIG. 8 shows first and second schematic side views of a second embodiment.

FIG. 8 shows side views of an alternative arrangement for moving between the "mirror rig" and "side-by-side" modes, wherein the rotatable disk 1 of the above described arrangement of FIGS. 4 to 7 is replaced by a sliding plate that is provided with first and second apertures that house the beam splitter 6 and the mirror/void combination 7, 8 respectively. Here the plate may slide upwards and downwards at a 45 degree angle along the centre plane between the cameras, as shown.

Figure 9:
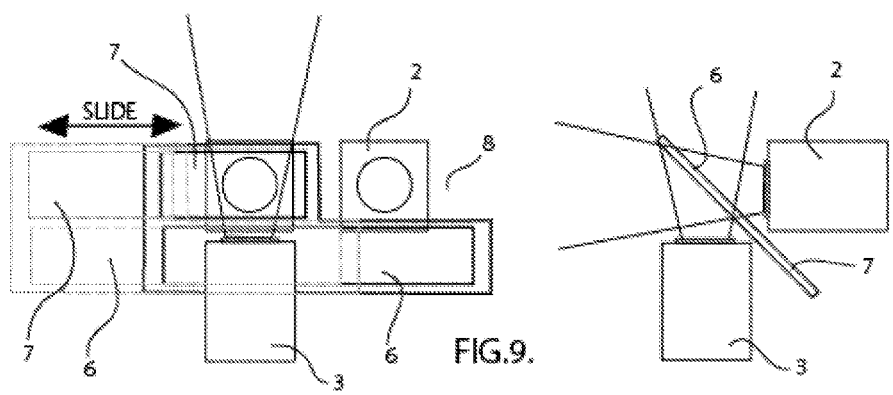
FIG. 9 shows schematic front and side views of a third embodiment.

A further alternative is shown in FIG. 9, which again comprises a sliding arrangement. In this arrangement, the void 8 is provided for by a cutout that the second camera 2 may look through.

Figure 10:
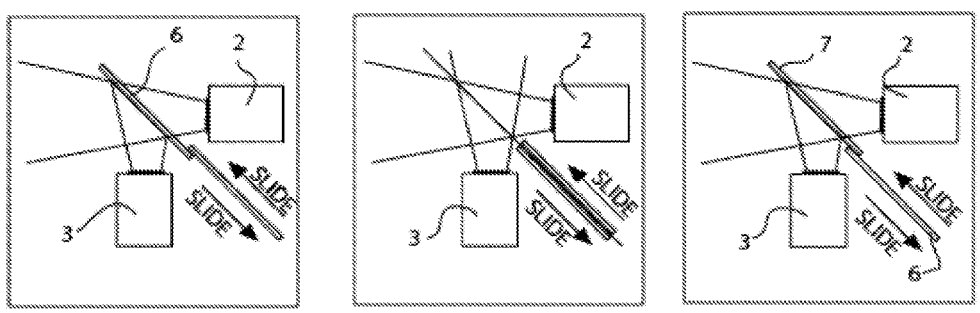
FIG. 10 shows first, second and third schematic side views of a fourth embodiment.

FIG. 10 shows a yet further alternative, which again is a sliding arrangement. Rather than providing a single sliding element, there are two sliding elements provided, which may slide independently of one another. The beam splitter 6 and mirror 7 are provided as two separate sliding entities which, like the arrangement of FIG. 8, can slide in front of the cameras at substantially 45 degrees, as shown. The beam splitter is able to slide in front of the first and second cameras 2, 3 for the "mirror rig" mode and the mirror is able to slide, separately, in front of the first camera for the "side by side" mode. Whichever of the beam splitter 6 or mirror 7 that is not in use may be retracted, as appropriate. The beam splitter 6 and mirror 7 can be tucked away between the cameras when not needed in a very compact manner, as shown. The only down side of this arrangement is that the mirrors align either side of the centre plane between the cameras which has the potential to cause some focus or sizing problems that require rectification. Such focus/sizing problems can be rectified electronically or by a slight shift forwards or backwards of the mirrors, to compensate, as will be readily appreciated by those skilled in the art.

Whilst the additional arrangements described above all include sliding mechanisms, it should be appreciated that the beam splitter and mirror may alternatively be hinged or pivoted or otherwise attached such that the camera system may be converted between the side-by-side and mirror rig modes, as desired.

In essence, any suitable means may be provided for effecting relative movement between the first camera and the beam splitter and the mirror, and for effecting relative movement between the second camera and the beam splitter, which relative movement allows for the transition between the first and second configurations. A single means may be provided for effecting movement of both the first and second cameras relative to the beam splitter and/or the mirror.

In further alternatives the beam splitter and mirror may be independently detachably mountable to the camera system, for example, the beam splitter may be detachably mountable between the first and second cameras and the mirror may be detachably mountable to the first camera. In such an arrangement when the camera system is in the first configuration, the beam splitter is mounted between the two cameras (with the mirror not present), and in the second configuration the beam splitter is attached to the first camera (with the mirror removed).

I claim:
1. A stereoscopic 3D camera system, comprising:
a first camera, having a first optical axis;
a second camera, having a second optical axis; and
a rotatable disk between said first camera and said second camera, wherein said rotatable disk is comprised of:
  a first aperture, having a beam splitter at least partially covering said first aperture and a void portion; and
  a second aperture having a mirror at least partially covering said second aperture,
wherein said first camera, said rotatable disk, and said second camera are arranged in a first configuration with said first optical axis of said first camera incident on said beam splitter and said second optical axis of said second camera incident on said beam splitter,
wherein said first camera, said rotatable disk, and said second camera are arranged in a second configuration with said first optical axis of said first camera incident on said mirror and said second optical axis of said second camera incident on said void portion, and
wherein said first camera, said rotatable disk, and said second camera actuate between said first configuration and said second configuration.

2. The camera system, as claimed in claim 1, wherein said first optical axis and said second optical axis are substantially orthogonal to one another.

3. The camera system, as claimed in claim 2, wherein said beam splitter is arranged at an angle of 45 degrees to said first optical axis in said first configuration, and wherein said mirror is arranged at an angle of 45 degrees to said first optical axis in said second configuration.

4. The camera system, as claimed in claim 3, wherein said beam splitter lies in a center plane between said first camera and said second camera in said first configuration, and wherein said mirror lies in said center plane in said second configuration.

5. The camera system, as claimed in claim 1, further comprising:
  a means for moving said first camera and said second camera towards and away from one another, said first camera and said second camera being moveable in a direction perpendicular to said first optical axis and said second optical axis.

6. The camera system, as claimed in claim 1, wherein said first optical axis and said second optical axis lie in the same plane as one another in said first configuration.

7. The camera system, as claimed in claim 1, wherein said beam splitter is slidably or rotatably mounted in said first aperture, and wherein said mirror is slidably or rotatably mounted in said second aperture.

8. The camera system, as claimed in claim 7, wherein said beam splitter and said mirror are mounted cooperatively so as to move together.

9. The camera system, as claimed in claim 7, wherein said void portion is comprised of said first aperture uncovered by said beam splitter.

10. The camera system, as claimed in claim 7, wherein said beam splitter and said mirror are mounted separate so as to move independently of one another.

11. A stereoscopic 3D camera system, comprising:
  a first camera, having a first optical axis;
  a second camera, having a second optical axis; and
  a slidable plate between said first camera and said second camera,
wherein said slidable plate is comprised of:
  a first panel, having a beam-splitter at least partially covering said first panel and a void portion; and
  a second panel having a mirror at least partially covering said second panel,
wherein said first camera, said slidable plate, and said second camera are arranged in a first configuration with said first optical axis of said first camera incident on said beam splitter and said second optical axis of said second camera incident on said beam splitter,
wherein said first camera, said slidable plate, and said second camera are arranged in a second configuration with said first optical axis of said first camera incident on said mirror and said second optical axis of said second camera incident on said void portion, and
wherein said first camera, said slidable plate, and said second camera actuate between said first configuration and said second configuration.

* * * * *